United States Patent
Choudhury et al.

(10) Patent No.: US 11,875,113 B2
(45) Date of Patent: Jan. 16, 2024

(54) SEMANTIC MATCHING OF JOB TITLES WITH LIMITED CONTEXTS

(71) Applicant: INTERNATIONAL BUSINESS MACHINES CORPORATION, Armonk, NY (US)

(72) Inventors: Smitashree Choudhury, Dublin (IE); Stephen Mitchell, Chapel Hill, NC (US); Scott Gerard, Wake Forest, NC (US); Abhay Choudhary, Dublin (IE); Paul Charles James Dunning, Ratoath (IE); Jacek Adam Piskorski, Monasterevin (IE); Wing Yin Leung, Dublin (IE); David Glenn George, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 240 days.

(21) Appl. No.: 16/868,575

(22) Filed: May 7, 2020

(65) Prior Publication Data

US 2021/0350078 A1    Nov. 11, 2021

(51) Int. Cl.
*G06F 40/279* (2020.01)
*G06F 40/30* (2020.01)
(Continued)

(52) U.S. Cl.
CPC ............ *G06F 40/284* (2020.01); *G06F 40/30* (2020.01); *G06N 20/00* (2019.01); *G06Q 10/1053* (2013.01)

(58) Field of Classification Search
CPC .... G06F 40/279; G06F 40/284; G06F 40/289; G06F 40/30; G06F 16/313;
(Continued)

(56) References Cited

U.S. PATENT DOCUMENTS 6,446,061 B1 * 9/2002 Doerre ................. G06F 16/355
                                                      707/738
8,838,618 B1 * 9/2014 Wu ....................... G06F 16/322
                                                      707/750
(Continued)

OTHER PUBLICATIONS

Koh, et al., "Intelligent job matching with self-learning recommendation engine", ScienceDirect, 6th International Conference on Applied Human Factors and Ergonomics (AHFE 2015) and the Affiliated Conferences, AHFE 2015, [accessed on Nov. 25, 2019], 7 pages, Procedia Manufacturing, Kuala Lumpur, MY, Retrieved from the Internet: <URL: https://www.sciencedirect.com/science/article/pii/S2351978915002425>.

(Continued)

*Primary Examiner* — Martin Lerner
(74) *Attorney, Agent, or Firm* — Alexis Hatzis; Lily Neff (57) ABSTRACT

A method, computer system, and a computer program product for semantic matching is provided. The present invention may include pre-processing and normalizing a job title. The present invention may include deconstructing the job title based on at least one semantic element. The present invention may include training a machine learning model. The present invention may include creating a contextual word representation of the job title using the at least one semantic element of the job title. The present invention may include computing a similarity score for each of the at least one semantic element of the job title. The present invention may lastly include applying a weight to the computed similarity score before making a final match assessment.

20 Claims, 6 Drawing Sheets

(51) Int. Cl.
  *G06Q 10/1053* (2023.01)
  *G06F 40/284* (2020.01)
  *G06N 20/00* (2019.01)
(58) Field of Classification Search
  CPC .............. G06F 16/3334; G06F 40/237; G06Q 10/1053; G06N 20/00
  USPC .................. 704/1, 9, 10; 705/7.14, 320, 321
  See application file for complete search history.

(56) References Cited

U.S. PATENT DOCUMENTS

| | | | |
|---|---|---|---|
| 9,558,271 B1 | 1/2017 | Sathe | |
| 10,318,900 B2* | 6/2019 | Carter | G06Q 10/1053 |
| 11,507,862 B2* | 11/2022 | Mitchell | G06Q 10/1053 |
| 2008/0313000 A1* | 12/2008 | Degeratu | G06Q 10/105 705/320 |
| 2014/0122355 A1* | 5/2014 | Hardtke | G06Q 10/1053 705/321 |
| 2015/0371277 A1* | 12/2015 | Filiz | G06Q 30/0269 705/14.66 |
| 2017/0193451 A1 | 7/2017 | Fang | |
| 2017/0228697 A1* | 8/2017 | Brdiczka | G06Q 10/1053 |
| 2017/0270100 A1* | 9/2017 | Audhkhasi | G06F 40/30 |
| 2017/0286865 A1 | 10/2017 | Fang | |
| 2017/0316361 A1* | 11/2017 | Jagota | G06F 16/9535 |
| 2017/0357945 A1* | 12/2017 | Ashkenazi | G06Q 10/1053 |
| 2017/0371957 A1 | 12/2017 | Merhav | |
| 2018/0107983 A1* | 4/2018 | Mir Ghaderi | G06F 16/24578 |
| 2018/0173802 A1* | 6/2018 | Grover | G06N 20/00 |
| 2018/0307750 A1* | 10/2018 | Gupta | G06F 40/295 |
| 2018/0336241 A1* | 11/2018 | Noh | G06F 16/242 |
| 2018/0357608 A1* | 12/2018 | Agrawal | G06Q 10/1053 |
| 2019/0108217 A1* | 4/2019 | Chen | G06F 40/30 |
| 2019/0156212 A1* | 5/2019 | Bottaro | G06F 16/3331 |
| 2019/0199741 A1* | 6/2019 | Myara | G06Q 30/0204 |
| 2019/0205376 A1* | 7/2019 | Merhav | G06F 40/284 |
| 2020/0151647 A1* | 5/2020 | Kathalagiri Somashekariah | G06N 20/00 |
| 2020/0193382 A1* | 6/2020 | Michaels | G06F 40/289 |
| 2020/0279182 A1* | 9/2020 | So | G06F 40/205 |
| 2020/0311162 A1* | 10/2020 | Xu | G06Q 10/063112 |
| 2021/0089715 A1* | 3/2021 | Asano | G06F 40/279 |
| 2021/0192376 A1* | 6/2021 | Sarferaz | G06F 40/40 |
| 2021/0248324 A1* | 8/2021 | Choudhary | G06F 40/30 |
| 2021/0334674 A1* | 10/2021 | Kuang | G06Q 10/105 |

OTHER PUBLICATIONS

Mell, et al., "The NIST Definition of Cloud Computing", National Institute of Standards and Technology, Special Publication 800-145, Sep. 2011, 7 pages.

Omni Analystics Group, "Job Title Matching", [accessed on Apr. 8, 2020], 2 pages, Retrieved from the Internet: <URL: https://labs.omnianalytics.io/job-title-matching>.

Versteegh, "Deep Learning for Categorizing Job Titles", textkernel.com, Sep. 15, 2016, 5 pages, Retrieved from the Internet: <URL: https://www.textkernel.com/using-deep-learning-categorizing-job-titles/>.

Zhu, et al., "Semantic Similarity Strategies for Job Title Classification", Semantic Scholar, 2016 [accessed on Mar. 26, 2020], 4 pages, Retrieved from the Internet: <URL: https://www.semanticscholar.org/paper/Semantic-Similarity-Strategies-for-Job-Title-Zhu-Javed/2b22bc00e23fc6665a190dcc0b3ce888e1f9d13c>.

* cited by examiner

SEMANTIC MATCHING OF JOB TITLES WITH LIMITED CONTEXTS

BACKGROUND

The present invention relates generally to the field of computing, and more particularly to online recruiting systems.

In a cognitive recruiting scenario, matching candidates to available positions may involve a multi-faceted matching process based on the candidates' skills, history, and competencies (e.g., comprising at least one level of granularity such as basic, experienced, and/or expert). The process of matching candidates to available positions may additionally occur in an ever-changing market, in which the requirements of an available position may be based on an industry context, and wherein available positions with the same name existing in different industries may have different skills requirements.

SUMMARY

Embodiments of the present invention disclose a method, computer system, and a computer program product for semantic matching. The present invention may include pre-processing and normalizing a job title. The present invention may include deconstructing the job title based on at least one semantic element. The present invention may include training a machine learning model. The present invention may include creating a contextual word representation of the job title using the at least one semantic element of the job title. The present invention may include computing a similarity score for each of the at least one semantic element of the job title. The present invention may lastly include applying a weight to the computed similarity score before making a final match assessment.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for semantic matching. As such, the present embodiment has the capacity to improve the technical field of cognitive recruitment by accounting for an inherent semantic structure of a job title, augmenting the job title with contextual knowledge of the semantic elements of the job title, and by computing a similarity score based on both general and domain specific knowledge bases, which score may indicate the similarity of components of the job title to components of a second job title. More specifically, the present invention may include pre-processing and normalizing a job title. The present invention may include deconstructing the job title based on at least one semantic element. The present invention may include training a machine learning model. The present invention may include creating a contextual word representation of the job title using the at least one semantic element of the job title. The present invention may include computing a similarity score for each of the at least one semantic element of the job title. The present invention may lastly include applying a weight to the computed similarity score before making a final match assessment.

As described previously, in a cognitive recruiting scenario, matching candidates to available positions may involve a multi-faceted matching process based on the candidates' skills, history, and competencies (e.g., comprising at least one level of granularity such as basic, experienced, and/or expert). The process of matching candidates to available positions may additionally occur in an ever-changing market, in which the requirements of an available position may be based on an industry context, and wherein available positions with the same name existing in different industries may have different skills requirements.

Therefore, it may be advantageous to, among other things, provide a means by which cognitive recruiting systems can provide a large-scale (e.g., macro, overall) overview of an available position based on a title of the available position (i.e., a job title), wherein the large-scale overview goes beyond a surface level matching of strings and words.

Instead, cognitive recruiting systems may utilize term-based vector matching, including term frequency-inverse document frequency (tf-idf) (e.g., a numerical statistic to determine how important a word is in a given document), to account for the inherent semantic structure of the title of the available position (i.e., the job title), which may be augmented with contextual knowledge of elements of the job title, in order to determine a similarity score of two job titles based on information included in one or more connected knowledge bases.

According to at least one embodiment, in a job recruitment scenario, each component of a candidate's curriculum vitae (CV), which includes, but is not limited to including, skills, education, work history and/or job title, may be given a score based on the component's similarity to a corresponding component of a job requisition and/or job description. In this case, the candidate's skills may be matched to any required skills of a job while the candidate's experience and/or job history may be factored in determining an appropriate job level.

According to at least one embodiment, a semantic similarity of two job titles may be determined (e.g., in instances where no other metadata is available and/or metadata is limited) in order to contribute to an overall job matching score.

According to at least one embodiment, a similarity score may be derived by first pre-processing and normalizing inputted job titles, and by then decomposing and reconstructing semantic elements within the inputted job titles. A job title may be a combination of semantic elements, including but not limited to a job role, a job level, and/or a job domain or functional area.

According to at least one embodiment, a similarity between job title elements may be computed using general purpose and domain-specific word embedding models and a similarity score may be assigned for each semantic element of the job titles.

Figure 1:
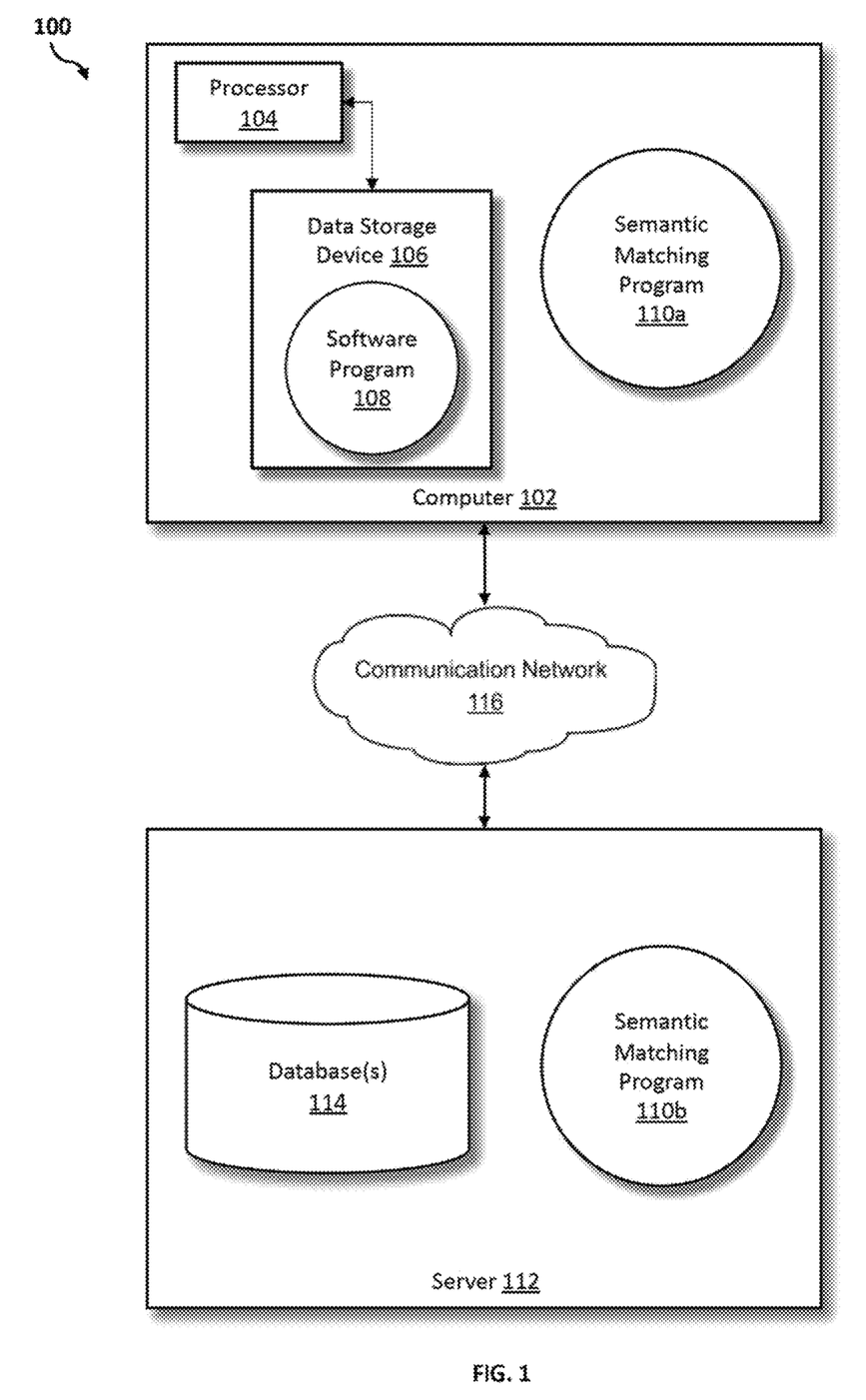
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a semantic matching program 110a. The networked computer environment 100 may also include a server 112 that is enabled to run a semantic matching program 110b that may interact with a database 114 (including but not limited to knowledge bases such as a data corpus and a domain data corpus) and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114 (including but not limited to knowledge bases such as a data corpus and a domain data corpus). According to various implementations of the present embodiment, the semantic matching program 110a, 110b may interact with a database 114 (including but not limited to knowledge bases such as a data corpus and a domain data corpus) that may be embedded in various storage devices, such as, but not limited to a computer/mobile device 102, a networked server 112, or a cloud storage service.

According to the present embodiment, a user using a client computer 102 or a server computer 112 may use the semantic matching program 110a, 110b (respectively) to utilize term-based vector matching to account for the inherent semantic structure of a title (i.e., a job title), which may be augmented with contextual knowledge of elements of the title, in order to determine a similarity score of two titles based on information included in one or more connected knowledge bases. The semantic matching method is explained in more detail below with respect to FIGS. 2 and 3.

Figure 2:
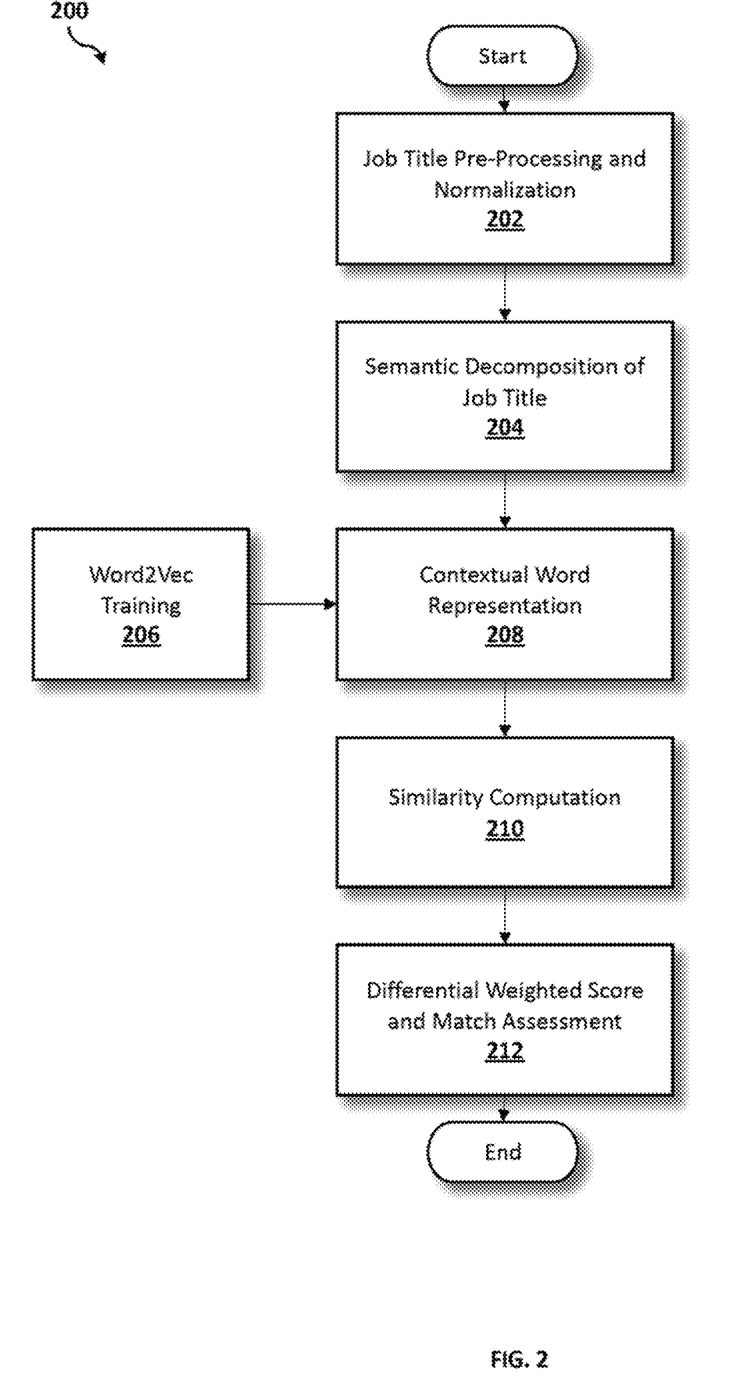
FIG. 2 is an operational flowchart illustrating a process for semantic matching according to at least one embodiment.

Referring now to FIG. 2, an operational flowchart illustrating the exemplary semantic matching process 200 used by the semantic matching program 110a and 110b according to at least one embodiment is depicted.

At 202, job title (i.e., title) pre-processing and normalization occurs. Once job titles are received for analysis (e.g., from a human user), the semantic matching program 110a, 110b may subject job titles to the following cleaning steps, which may be done in the following order: word tokenization (e.g., where a job title is segmented into single-word tokens); standard and domain-specific stop word removal (e.g., where informal words such as "on" and "in" are removed); lemmatization (e.g., where inflection endings are removed and words are converted to their dictionary form); punctuation removal (e.g., punctuation including, but not limited to, periods and question marks are removed from the title); geographic data removal (e.g., removal of cities, states, and/or countries, among other geographic location data); and removal of numeric-only terms.

Word tokenization may be a process by which a text string (i.e., the job title) is split into the individual words (e.g., tokens) that comprise the text string so that natural language processing may done on each token.

Standard and domain-specific stop word removal may be done by comparing each token (e.g., each individual word comprising the text string) to a standard and a domain-specific stop word list which may be preprogrammed within the semantic matching program 110a, 110b. The standard and domain-specific stop word lists may also be dynamic and modifiable by users of the semantic matching program 110a, 110b to reflect ever-changing industries to which the lists pertain.

Lemmatization may be done by converting words to their dictionary form, based on one or more dictionaries utilized by the semantic matching program 110a, 110b. The use of one or more dictionaries by the semantic matching program 110a, 110b may be at the discretion of a user of the semantic matching program 110a, 110b, and may include both standard and/or domain-specific dictionaries.

Punctuation, geographic data and numeric terms may be determined based on connected databases defining punctuation, geographic data, and numeric terms, respectively, which may each be dynamic and modifiable by a user of the semantic matching program 110a, 110b.

After pre-processing of the job title, the job title may be augmented by adding contextual data which may include word synonyms derived from existing pre-curated dictionaries (e.g., wordnet and/or abbreviation dictionaries) and by expanding various abbreviated terms to their unabbreviated forms, with all abbreviations in the job title being resolved based on a pre-curated dictionary (e.g., CTO may become Chief Technology Officer and QA may become Quality Assurance). The pre-curated dictionary may be dynamic and modifiable by a user of the semantic matching program 110a, 110b.

For example, two job titles, "Principal Data Engineer" and "Senior Machine Learning Engineer" may be compared by the semantic matching program 110a, 110b to determine a degree of semantic matching.

At 204, semantic decomposition (i.e., deconstruction) of the job title is done. A job title may be a combination of semantic elements, including but not limited to a job role (e.g., a manager, an engineer, or an analyst, etc.), a job level (e.g., junior, senior, lead, etc.), and/or a job domain or functional area (e.g., software, energy, etc.). Based on this categorization, a job title may have a minimum of 1 and a maximum of 3 semantic elements. A job title that includes a job role without a job level or a job domain may be a valid job title (e.g., there may be instances where a job title is comprised solely of a job role), however, a job level or job domain without a job role may not be a valid job title. For example, the job title "software engineering" does not contain a job role or a job level and may not be considered a valid job title because no details on a desired applicant may be surmised from the job domain alone. However, "software engineer" or "software engineering manager" both contain a job role (e.g., engineer and manager, respectively) and may be considered valid job titles since a desired applicant may be determined from the job title.

The semantic matching program 110a, 110b may determine whether two or more job titles are semantically similar based on a comparison of the deconstructed elements of the job title (e.g., by a comparison of the individual tokens, as described previously with respect to step 202 above). If, for example, two jobs are semantically similar, then the two jobs may be similar in both job role and/or job domain or functional area.

A matching of all three semantic elements of the job title may result in a match score which is close to 1, which may imply that the semantic relatedness of the job titles is higher (e.g., where a match score is a range from 0-1 with 1 being a perfect or equal match).

Once a job title is pre-processed and normalized, as described previously with respect to step 202 above, then each token (i.e., word) of the job title may be compared and may be classified into a level, a role, and/or a domain. Terms corresponding to the level, the role, and the domain may be defined within dynamic, pre-curated dictionaries stored within the semantic matching program 110a, 110b.

For example, a semantic decomposition may be achieved using a pre-curated job role dictionary, job domain dictionary, and/or a job level dictionary. The job role dictionary and the job level dictionary may be based on a job taxonomy (e.g., including information corresponding to job content and industries and/or sectors) which may be curated using statistical and textual mining techniques on a large domain-specific dataset such as the CareerBuilder™ dataset (CareerBuilder is a trademark or registered trademark of CareerBuilder, LLC in the United States, and/or other countries).

Each of the connected dictionaries may be dynamic in nature, permitting users of the semantic matching program 110a, 110b to modify and/or extend the dictionaries as jobs and industries change and/or as new jobs emerge.

Continuing with the above example, semantic decomposition of the job titles may be done. The semantic elements of "Principal Data Engineer" may be as follows: job role: engineer; job domain: data; job level: principal. The semantic elements of "Senior Machine Learning Engineer" may be as follows: job role: engineer; job domain: machine learning; job level: senior.

At 206, Word2vec training is done. The Word2vec models, which may be shallow neural networks (e.g., a type of machine learning model often used in natural language processing applications) used by the semantic matching program 110a, 110b, may be trained following the pre-processing steps and hyper parameter tuning on short text and job related data. Model training may be done using either generic data (e.g., data covering all domains) such as that found on Wikipedia® (Wikipedia is a registered trademark of the Wikimedia Foundation, Inc. in the United States and/or other countries) or domain-specific data such as that found on CareerBuilder™, or a combination of the two.

Word2vec models may be trained using either a continuous bag of words (CBOW) approach or a skip-gram approach. For short text matching, a CBOW approach may be more accurate than a skip gram approach. Parameters such as vector size and window size may be configurable and may be adjusted depending on the application context. In this case, a vector size of 300 may be a recommended default, however, the parameter may be configurable. A window size of 3-5 may also be a recommended default based on the nature of a job title, which may not be considered a long sentence. Thus, it may be expected that a window size of 3-5 may capture the semantics of the present case sufficiently.

This may result in a matrix of size m*n, where m may be a size of the vocabulary (e.g., a number of unique words existing in the training data) and n may be a dimension parameter for the model with each word being a row with 300 additional values as its context. The context window may be a parameter used to train the model, with m being a number of words in the corpus used to build the model and n being a dimension vector for each word.

At 208, contextual word representation of the job title is done. These representations may be derived from Word2vec models which may have been previously trained. Similarity between semantic elements of a job title may be determined using general purpose and/or domain-specific word to vector language models (e.g., word embeddings) including Word2vec (Mikolov et al. 2013). These language models may be shown to capture semantic relationships between words by means of a cooccurrence probability which may be relevant to a lexical interpretation. Word to vector models may be shallow neural network-based word representation techniques which may capture word semantics within a word context.

However, most of the general purpose word embedding models (e.g., GloVe, Jeffrey Pennington et al. 2014; and/or Wikipedia®-based (Wikipedia is a registered trademark of the Wikimedia Foundation, Inc. in the United States and/or other countries) Word2vec models, etc.) may be less effective for technical and domain-specific terms and may fail to capture the intended semantics due to a lack of statistical cues in the underlying training corpus. Therefore, a domain-specific model may be used in combination with the general purpose model.

A domain-specific word embedding model may use job related content (e.g., historical job postings) to capture semantics of words in the relevant domain-specific context. The historical job postings may be mined from connected datasets, including CareerBuilder™, as described previously with respect to step 204 above.

This may be further refined based on an industry of the job, which may be determined based on the semantic decomposition of the job title, as described previously with respect to step 204 above, and a target model may be adjusted before computing a similarity score (the similarity score will be discussed in more detail with respect to step 210 below). For example, in a domain-specific word embedding model scenario, a finance job may rely on a model trained on finance, banking, and/or insurance job postings instead of models trained on information technology jobs.

Specifically, the target model may be based on a domain of a job posting. For example, if a job posting relates to banking and/or finance, historical job postings used to build the target model may also relate to banking and/or finance. Word embeddings may be extracted from these adjusted models such that the domain semantic may be captured more reliably than a model trained using job data which spans multiple industries.

Domain-specific word embedding models may include, but are not limited to including, global reference models (e.g., using Wikipedia® as a corpus (Wikipedia is a registered trademark of the Wikimedia Foundation, Inc. in the United States and/or other countries)), job models (e.g., based on job postings), and/or job domain models (e.g., using job domains or functional areas).

At 210, a similarity score is computed. The semantic matching program 110a, 110b may compute three different similarity scores; a job role similarity score, a job domain similarity score, and a job level similarity score. The job role similarity score and the job domain similarity score may be computed using a cosine distance between the averaged word vectors, which may be an accepted distance measure to accurately capture the word semantics. To compute the job level similarity score, the job level terms may be extracted from the job title and classified into four groups (e.g., "junior/entry," "mid/intermediate," "senior/experienced," and "executive/management") and a similarity score may thereafter be assigned. This categorization technique may be done to account for an inherent difficulty in capturing the true meaning of a job level and thus matching two or more job levels. A job level may be based on organizational hierarchies and may not be standardized based on industry. Therefore, by extracting terms indicative of a job level and by categorizing the job levels, a match score may be computed.

Once similarity scores are computed for the job role and the job domain, the semantic matching program 110a, 110b may use the computed scores to create a combined match score. The combined match score may not be a simple average but may be a weighted average, as will be described in more detail with respect to step 212 below, with the weight being determined based on the informativeness (i.e., specificity) of the job role.

To give weight to each job role, a global role relevance score may be computed by assessing the job role's usage statistics in the larger text corpus. For example, the term "manager" may have a wider usage in any text corpus than the term "recruiter" or "dentist." Hence, when the job role is manager, it may be considered less informative as compared to an instance where the job role is dentist. The weight of a job role may be determined in multiple ways; however, the present technique may be a simple yet effective means by which to calculate the job role weight.

Based on the above, if the job role is generic, then the weight of the job role similarity score reduces as compared to the weight of the job domain similarity score.

Continuing with the above example, a similarity score of the job titles may be computed. The role similarity score (e.g., comparing "engineer" to "engineer") may be determined to be 1.0 based on a cosine similarity of the two vectors (e.g., the vectors here are the same as the words are identical). The domain similarity score (e.g., comparing "data" and "machine learning") may be determined to be 0.63 based on a cosine similarity of the two vectors. The level similarity score may be determined to be 1.0 based on contextual data (e.g., an analysis of synonyms of the determined job level reveals that "principal" and "senior" fall under the same category).

At 212, differential weighted scores are applied to job elements and a final match assessment is made. Different score weights may be used depending on a context of the job posting. If the job roles are generic (e.g., manager, engineer, etc.) then the job domain score may achieve a higher weight than the job role score. Alternatively, if the roles are specific (e.g., dentist, recruiter, etc.) then the score weights may be reversed. The differential weighed scores may be based on a word entropy (i.e., informativeness) or on term frequency-inverse document frequency (tf-idf) score. As described previously, the combined match score may not be a simple average but may be a weighted average, with the weight being determined based on the informativeness (i.e., specificity) of the job role. For example, if the job role is generic, then the weight of the job role similarity score reduces as compared to the weight of the job domain similarity score.

A final match assessment may be made based on the generated match score, as described above. For example, based on the match score, a match category of high, medium, or low may be presented to a human user of the semantic matching program 110a, 110b indicating a degree of similarity between two job titles. The match categories may be configurable by a human user of the semantic matching program 110a, 110b and may be based on intuitive decision making. For example, a match category of high may have an associated match score of above 0.7, a match category of medium may have an associated match score of 0.4-0.7, and a match category of low may have an associated match score of less than 0.4. These configured categories may be configured and influenced by the relevant domain of the application, and may not be predetermined solely by the semantic matching program 110a, 110b.

The final match assessment may also detail how the match category was determined. For example, the final match assessment might indicate that despite two job titles being dissimilar (e.g., "Executive Vice President, Cloud" and "Senior Cloud Engineer"), the semantic matching program 110a, 110b has realized (e.g., based on the functionality described above) that the functions of the two jobs (i.e., the job roles) are the same. Based on this, the semantic matching program 110a, 110b generates a match score which falls within a match category of medium. Accordingly, the semantic matching program 110a, 110b returns to the user a final match assessment detailing the generated match scores and supporting comparison reasoning (e.g., the semantic matching program 110a, 110b outputs to the user, along with the final match category, the portions of text that are determined to be semantically similar). A format of the displayed text (e.g., a level of detail to include in the user's output) may be modified by a user of the semantic matching program 110a, 110b.

Figure 3:
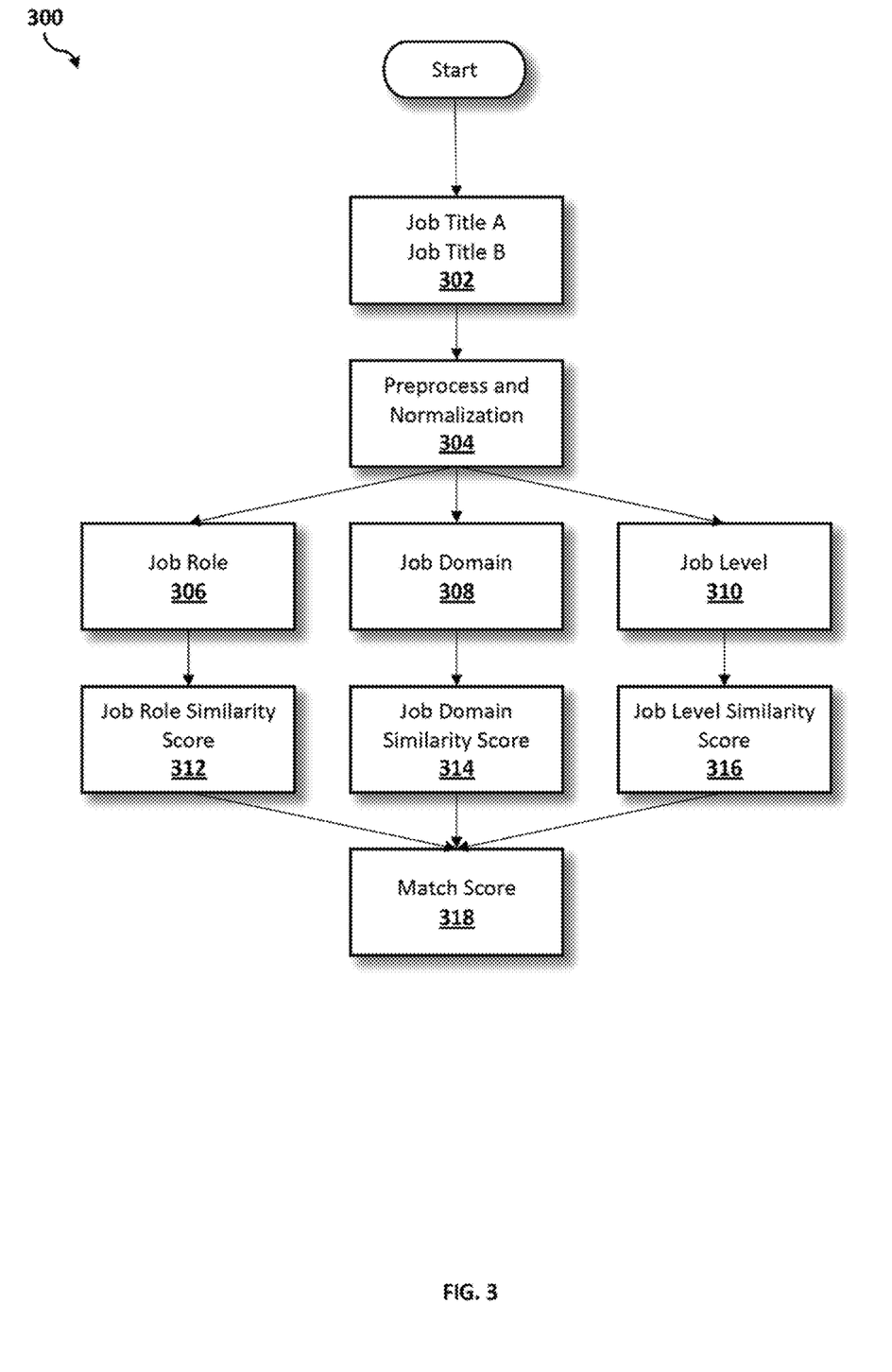
FIG. 3 is a block diagram of the semantic matching process according to at least one embodiment.

Referring now to FIG. 3, a block diagram of the semantic matching program 110a, 110b according to at least one embodiment is depicted. At 302, Job Title A and Job Title B are received by the semantic matching program 110a, 110b so that a semantic matching may be determined. At 304, pre-processing and normalization of Job Title A and Job Title B is done. As described previously with respect to step 202 above, the semantic matching program 110a, 110b may subject Job Title A and Job Title B to the following cleaning steps, which may be done in the following order: word tokenization, standard and domain-specific stop word removal, lemmatization, punctuation removal, geographic data removal, and removal of numeric-only terms.

Semantic decomposition of the job title may then be done, as described previously with respect to step 204 above, and the job role 306, job domain 308, and job level 310 may be extracted from the Job Titles A and B. A job role similarity score 312, a job domain similarity score 314 and a job level similarity score 316 may thereafter be computed as described previously with respect to step 210 above.

A match score 318 may be computed based on the job role similarity score 312, job domain similarity score 314 and job level similarity score 316, described above.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
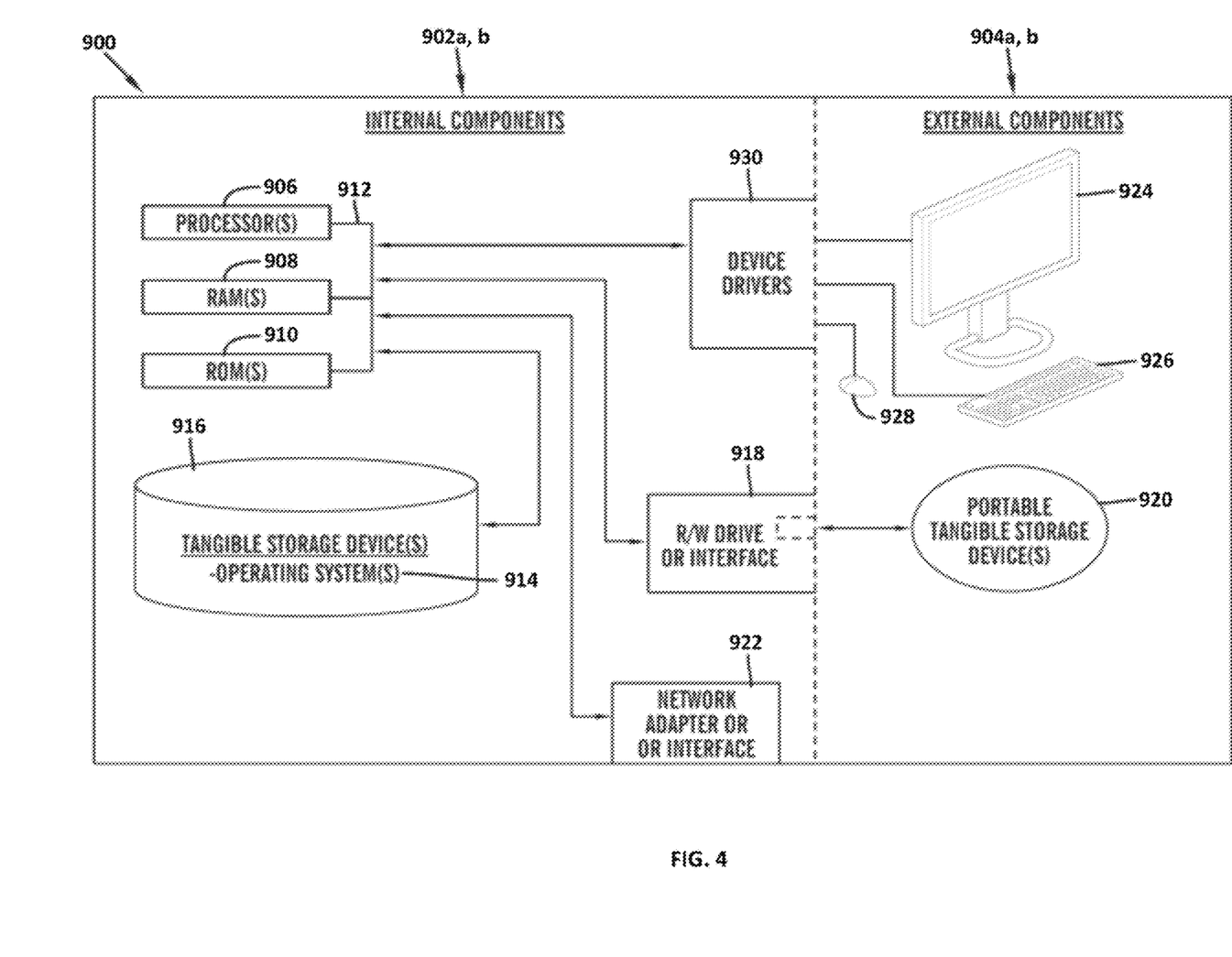
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the semantic matching program 110a in client computer 102, and the semantic matching program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the semantic matching program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the semantic matching program 110a in client computer 102 and the semantic matching program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the semantic matching program 110a in client computer 102 and the semantic matching program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
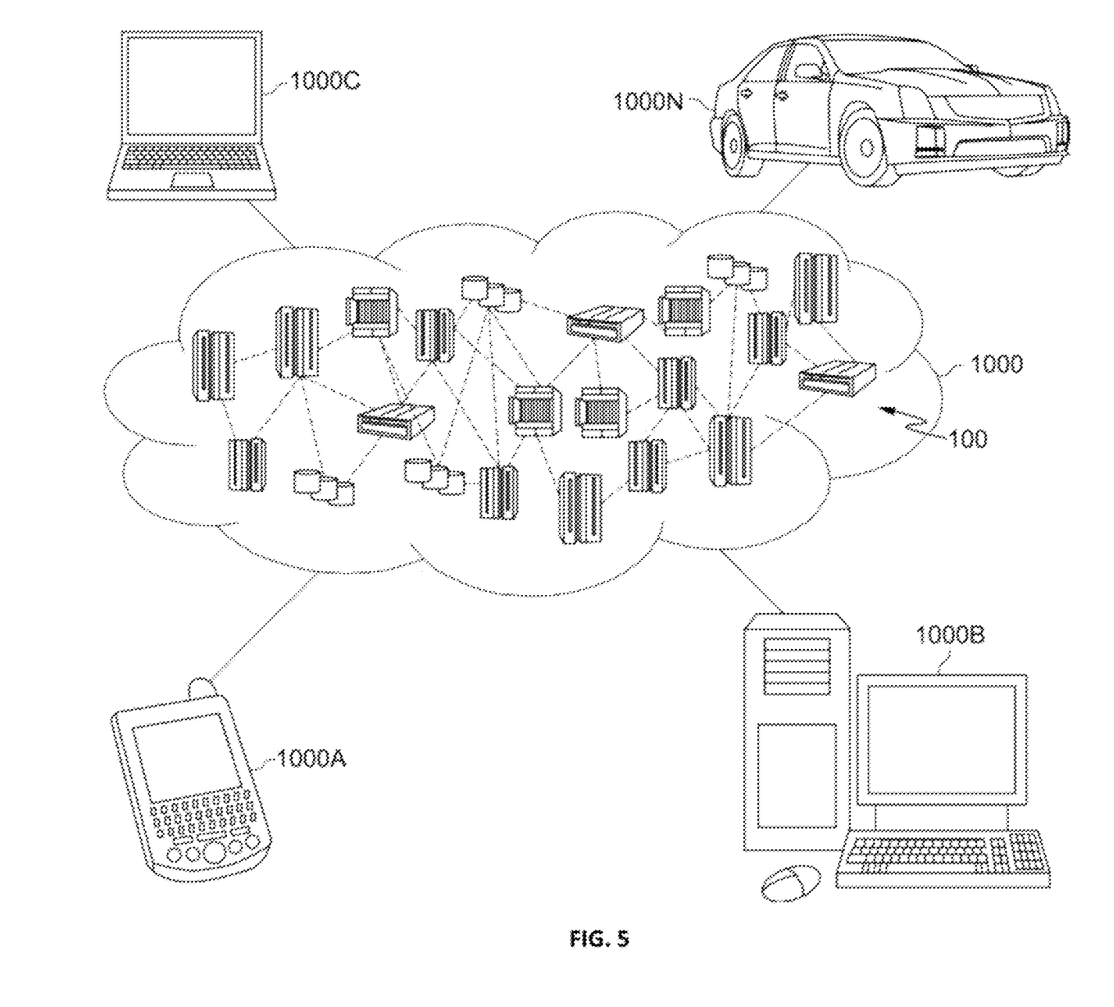
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described herein above, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
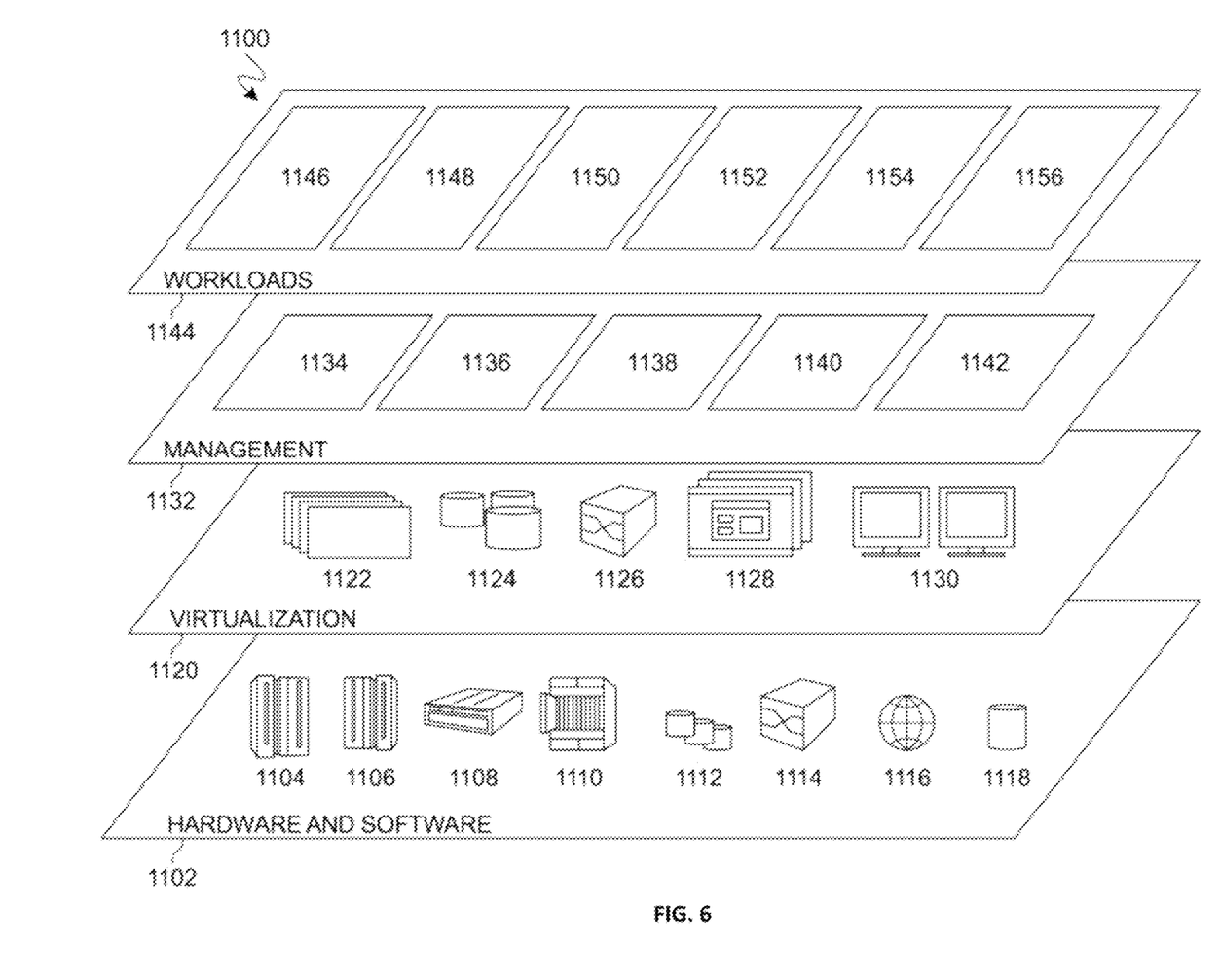
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized.

Examples of workloads and functions which may be provided from this layer include: mapping and navigation 1146; software development and lifecycle management 1148; virtual classroom education delivery 1150; data analytics processing 1152; transaction processing 1154; and semantic matching 1156. A semantic matching program 110a, 110b provides a way to utilize term-based vector matching to account for the inherent semantic structure of a title (i.e., a job title), which may be augmented with contextual knowledge of elements of the title, in order to determine a similarity score of two titles based on information included in one or more connected knowledge bases.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for semantic matching, the method comprising:
    pre-processing and normalizing a job title by segmenting the job title into single word tokens and removing informal words, geographic data and numeric data from the job title;
    deconstructing the job title based on at least one semantic element, wherein the job title includes 3 semantic elements;
    training a machine learning model using at least continuous bag of words;
    creating a contextual word representation of the job title using the at least one semantic element of the job title, wherein the contextual word representation of the job title is refined based on an industry of a job;
    adjusting the machine learning model based on the industry of the job and computing a similarity score for each of the at least one semantic element of the job title using a cosine distance of the contextual word representation;
    adjusting the machine learning model to determine a similarity match based on a general purpose and a domain specific match as determined by a concurrence probability relevant to at least a lexical interpretation; and
    applying a weight to the computed similarity score, wherein the weight is a differential weight based on a word entropy score or a term frequency-inverse document frequency (tf-idf) score, and making a final match assessment which details how a match category of high, medium, or low, corresponding to a generated match score, was determined.

2. The method of claim 1, wherein pre-processing and normalizing the job title further comprises:
    converting one or more elements of the job title into a dictionary form without an inflection ending; and
    eliminating punctuation from the job title.

3. The method of claim 1, further comprising:
    adding contextual data, including word synonyms, to the job title based on a connected, dynamic, pre-curated dictionary; and
    expanding at least one word within the job title to an unabbreviated form of the word.

4. The method of claim 1, wherein the at least one semantic element of the job title is selected from the group consisting of a job role, a job level, and a job domain.

5. The method of claim 4, wherein the at least one semantic element is classified based on a connected, pre-curated, job role dictionary and/or a job level dictionary, wherein the job role dictionary and the job level dictionary are based on a job taxonomy curated using statistical and textual mining on a large domain-specific dataset.

6. The method of claim 1, wherein the machine learning model is a Word2vec model.

7. The method of claim 1, wherein performing the contextual word representation of the job title based on the semantic elements of the job title is done using general purpose and/or domain-specific word to vector language models.

8. The method of claim 1, wherein the at least one similarity score is selected from the group consisting of a job role similarity score, a job level similarity score, and a job domain similarity score.

9. The method of claim 1, wherein applying the weight to the computed similarity score further comprises:
    computing a global relevance score.

10. A computer system for semantic matching, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
        pre-processing and normalizing a job title by segmenting the job title into single word tokens and removing informal words, geographic data and numeric data from the job title;
        deconstructing the job title based on at least one semantic element, wherein the job title includes 3 semantic elements;
        training a machine learning model using at least continuous bag of words;
        creating a contextual word representation of the job title using the at least one semantic element of the job title, wherein the contextual word representation of the job title is refined based on an industry of a job;
        adjusting the machine learning model based on the industry of the job and computing a similarity score for each of the at least one semantic element of the job title using a cosine distance of the contextual word representation;
        adjusting the machine learning model to determine a similarity match based on a general purpose and a domain specific match as determined by a concurrence probability relevant to at least a lexical interpretation; and
        applying a weight to the computed similarity score, wherein the weight is a differential weight based on a word entropy score or a term frequency-inverse document frequency (tf-idf) score, and making a final match assessment which details how a match category of high, medium, or low, corresponding to a generated match score, was determined.

11. The computer system of claim 10, wherein pre-processing and normalizing the job title further comprises:

converting one or more elements of the job title into a dictionary form without an inflection ending; and eliminating punctuation from the job title.

12. The computer system of claim 10, further comprising:

adding contextual data, including word synonyms, to the title based on a connected, dynamic, pre-curated dictionary; and expanding at least one word within the job title to an unabbreviated form of the word.

13. The computer system of claim 10, wherein the at least one semantic element of the job title is selected from the group consisting of a job role, a job level, and a job domain.

14. The computer system of claim 13, wherein the at least one semantic element is classified based on a connected, pre-curated, job role dictionary and/or a job level dictionary, wherein the job role dictionary and the job level dictionary are based on a job taxonomy curated using statistical and textual mining on a large domain-specific dataset.

15. The computer system of claim 10, wherein the machine learning model is a Word2vec model trained.

16. The computer system of claim 10, wherein performing the contextual word representation of the job title based on the semantic elements of the job title is done using general purpose and/or domain-specific word to vector language models.

17. The computer system of claim 10, wherein the at least one similarity score is selected from the group consisting of a job role similarity score, a job level similarity score, and a job domain similarity score.

18. The computer system of claim 10, wherein applying the weight to the computed similarity score further comprises:

computing a global relevance score.

19. A computer program product for semantic matching, comprising:

one or more non-transitory computer-readable storage media and program instructions stored on at least one of the one or more tangible storage media, the program instructions executable by a processor to cause the processor to perform a method comprising:

pre-processing and normalizing a job title by segmenting the job title into single word tokens and removing informal words, geographic data and numeric data from the job title;

deconstructing the title based on at least one semantic element, wherein the job title includes 3 semantic elements;

training a machine learning model using at least continuous bag of words;

creating a contextual word representation of the job title using the at least one semantic element of the job title, wherein the contextual word representation of the job title is refined based on an industry of a job;

adjusting the machine learning model based on the industry of the job and computing a similarity score for each of the at least one semantic element of the job title using a cosine distance of the contextual word representation;

adjusting the machine learning model to determine a similarity match based on a general purpose and a domain specific match as determined by a concurrence probability relevant to at least a lexical interpretation; and applying a weight to the computed similarity score, wherein the weight is a differential weight based on a word entropy score or a term frequency-inverse document frequency (tf-idf) score, and making a final match assessment which details how a match category of high, medium, or low, corresponding to a generated match score, was determined.

20. The computer program product of claim 19, wherein the at least one semantic element of the job title is selected from the group consisting of a job role, a job level, and a job domain, and wherein the at least one semantic element is classified based on a connected, pre-curated, job role dictionary and/or a job level dictionary, wherein the job role dictionary and the job level dictionary are based on a job taxonomy curated using statistical and textual mining on a large domain-specific dataset.

* * * * *